United States Patent
Cochran et al.

(10) Patent No.: US 10,958,617 B2
(45) Date of Patent: Mar. 23, 2021

(54) SYSTEMS AND METHODS FOR USING DOMAIN NAME SYSTEM CONTEXT BASED RESPONSE RECORDS

(71) Applicant: VERISIGN, INC., Reston, VA (US)

(72) Inventors: John Cochran, Reston, VA (US); Karthik Shyamsunder, Winchester, VA (US); Ashvatth Lakshmanan, Falls Church, VA (US)

(73) Assignee: VERISIGN, INC., Reston, VA (US)

( * ) Notice: Subject to any disclaimer, the term of this patent is extended or adjusted under 35 U.S.C. 154(b) by 297 days.

(21) Appl. No.: 15/483,165

(22) Filed: Apr. 10, 2017

(65) Prior Publication Data
US 2018/0295095 A1    Oct. 11, 2018

(51) Int. Cl.
| | | |
|---|---|---|
| G06F 15/16 | (2006.01) | |
| H04L 29/12 | (2006.01) | |
| H04L 29/08 | (2006.01) | |
| G06F 16/955 | (2019.01) | |
| H04L 12/58 | (2006.01) | |

(52) U.S. Cl.
CPC ...... *H04L 61/1511* (2013.01); *G06F 16/9566* (2019.01); *H04L 67/02* (2013.01); *H04L 67/22* (2013.01); *H04L 51/32* (2013.01)

(58) Field of Classification Search
CPC ... H04L 29/08072; H04L 29/06; H04L 51/32; H04L 29/12066; H04L 67/02; H04L 67/22; H04L 61/1151; G06F 16/9566
USPC ................. 709/220, 224, 227, 228
See application file for complete search history.

(56) References Cited

U.S. PATENT DOCUMENTS

| | | | | |
|---|---|---|---|---|
| 9,077,677 | B2* | 7/2015 | Mackin | H04L 51/32 |
| 9,363,191 | B2* | 6/2016 | Gustafsson | H04L 29/12066 |
| 9,923,914 | B2* | 3/2018 | Stiansen | H04L 63/1425 |
| 10,498,756 | B2* | 12/2019 | Yampolskiy | G06F 21/57 |
| 2013/0254414 | A1* | 9/2013 | Gustafsson | H04L 29/12066 |
| | | | | 709/229 |
| 2013/0311906 | A1* | 11/2013 | Mackin | H04L 51/32 |
| | | | | 715/758 |

(Continued)

OTHER PUBLICATIONS

Extended European Search Report issued in corresponding European Patent Application No. 18166479.8 dated Jun. 14, 2018.

(Continued)

*Primary Examiner* — Khanh Q Dinh
(74) *Attorney, Agent, or Firm* — MH2 Technology Law Group, LLP

(57) ABSTRACT

A technique for resolving a uniform resource locator (URL) present on a social network website is presented. The technique includes detecting that a user's computing device is rendering a social network web page on the social network website, detecting a user activation of the URL present on the social network web page, where the URL present on the social network web page includes a domain name, obtaining a domain name system (DNS) resource record for the domain name, detecting, in the DNS resource record for the domain name, an entry for the social network website associated with a destination URL, retrieving content from the destination URL in response to at least the detecting that the user's computing device is rendering the social network web page and the detecting a user activation of the URL present on the social network web page, and causing the content to be displayed.

22 Claims, 4 Drawing Sheets

(56) References Cited

U.S. PATENT DOCUMENTS

| | | | |
|---|---|---|---|
| 2015/0120447 A1* | 4/2015 | Blemaster | G06Q 30/0277 |
| | | | 705/14.54 |
| 2015/0120696 A1* | 4/2015 | Blemaster | G06Q 30/0256 |
| | | | 707/711 |
| 2015/0143212 A1* | 5/2015 | Shamir | G06Q 10/107 |
| | | | 715/205 |
| 2016/0275193 A1* | 9/2016 | Abrams | G06F 16/9535 |
| 2017/0295144 A1* | 10/2017 | Song | H04L 63/0428 |
| 2018/0114279 A1* | 4/2018 | Abrams | G06Q 50/01 |
| 2018/0205734 A1* | 7/2018 | Wing | H04L 61/1511 |
| 2018/0295095 A1* | 10/2018 | Cochran | G06F 16/9566 |

OTHER PUBLICATIONS

Brucelee et al., "Doman Name System", Wikipedia—(2017) XP055481713; retrieved from the Internet: https://en.wikipedia.org/w/index.php?title=Domain_Name_System&oldid=774134009.

Romu006 et al., "TXT record", Wikipedia—(2017) XP055481727; retrieved from the Internet: https://en.wikipedia.org/w/index.php?title=TXT_record&oldid=766003490.

* cited by examiner

US 10,958,617 B2

SYSTEMS AND METHODS FOR USING DOMAIN NAME SYSTEM CONTEXT BASED RESPONSE RECORDS

FIELD

This disclosure relates generally to the use of internet domain names.

BACKGROUND

The domain name system ("DNS") is a hierarchical distributed naming system for resources provided by computer servers that are connected to the internet. It associates domain names to numeric internet protocol ("IP") addresses of internet resources, including resources managed by web hosting providers, which provide the web server computers that serve the web pages associated with domain names. The DNS thus allows computers and humans to access networked resources including web pages using names.

The DNS uses "resource records", which are persistently stored, formatted data structures that include information relevant to performing DNS tasks. For example, IP addresses are specified by DNS "A" or "AAAA" resource records, which include both a domain name and the associated IP address for the computer server that hosts the domain, i.e., the web hosting provider.

A DNS "registry" is an authoritative, master database of all domain names registered in a top-level domain or other domain in which domain names can be registered. A registry includes many hardware computer servers operably coupled to the internet. A registry keeps the master database and also generates a "zone file" comprising DNS resource records for the top-level domain, which allows computers to look up DNS records in the top-level domain from anywhere in the world. Internet users generally interact with the registry via intermediaries. For ease of discussion, a registry is identified with its hardware computer servers unless otherwise specified or clear from context.

Domain names can be registered by internet users known as "registrants" through many different companies known as "registrars". Registrars compete with one another to register domain names for registrants. That is, an internet user interacts with a registrar to obtain a domain name, thereby becoming a registrant for the domain. The registrar chosen by the registrant asks the registrant to provide various contact and technical information that makes up the registration. The registrar then keeps a record of the contact information and submits the technical information to the registry. For ease of discussion, a registrar is identified with its hardware computer servers unless otherwise specified or clear from context. Further, an internet user has a hardware client computer. For ease of discussion, a registrant is identified with its hardware client computer unless otherwise specified or clear form context.

SUMMARY

According to various embodiments, a method of resolving a uniform resource locator (URL) present on a social network website is presented. The method includes detecting that a user's computing device is rendering a social network web page on the social network website; detecting a user activation of the URL present on the social network web page, where the URL present on the social network web page includes a domain name; obtaining a domain name system (DNS) resource record for the domain name; detecting, in the DNS resource record for the domain name, an entry for the social network website associated with a destination URL; retrieving content from the destination URL in response to at least the detecting that the user's computing device is rendering the social network web page and the detecting a user activation of the URL present on the social network web page; and causing the content to be displayed.

Various optional features of the above embodiments include the following. The detecting that a user's computing device is rendering the social network web page may be performed by a web browser executing on the user's computing device. The detecting that a user's computing device is rendering the social network web page may be performed by the social network web page. The DNS resource record may be a text (TXT) DNS resource record. The destination URL may be for a social network web page of an owner of the domain name. The retrieving content may be performed by the social network website. The retrieving content may be performed by a web browser executing on the user's computing device. The DNS resource record may include a plurality of entries, each of the plurality of entries including a domain name associated with a respective destination URL not including the associated domain name. The social network web page may be a social network profile page for an entity different from the user. The retrieving content from the destination URL further may include forwarding the URL present on the social network web page to a computer host of the destination URL.

According to various embodiments, a system for resolving a uniform resource locator (URL) present on a social network website is presented. The system includes at least one electronic processor configured to perform: detecting that a user's computing device is rendering a social network web page on the social network website; detecting a user activation of the URL present on the social network web page, where the URL present on the social network web page includes a domain name; obtaining a domain name system (DNS) resource record for the domain name; detecting, in the DNS resource record for the domain name, an entry for the social network website associated with a destination URL; retrieving content from the destination URL in response to at least the detecting that the user's computing device is rendering the social network web page and the detecting a user activation of the URL present on the social network web page; and causing the content to be displayed.

Various optional features of the above embodiments include the following. The at least one electronic processor configured to perform detecting that a user's computing device is rendering the social network web page may include at least one electronic processor of the user's computing device executing a web browser on the user's computing device. The at least one electronic processor configured to perform detecting that a user's computing device is rendering the social network web page may include at least one electronic processor of computing equipment hosting the social network web page. The DNS resource record may be a text (TXT) DNS resource record. The destination URL may be for a social network web page of an owner of the domain name. The at least one electronic processor configured to perform retrieving content may include at least one electronic processor of computing equipment hosting the social network web page. The at least one electronic processor configured to perform retrieving content may include at least one electronic processor of the user's computing device executing a web browser on the user's computing device. The DNS resource record may include a plurality of entries, each of the plurality of entries including a domain name associated with a respective destination URL not including the associated domain name. The social network web page may be a social network profile page for an entity different from the user. The at least one electronic processor configured to perform retrieving content from the destination URL may be further configured to forward the URL present on the social network web page to a computer host of the destination URL.

According to various embodiments, a method of directing an electronic message, within a computer messaging platform, to a destination user identified by a domain name, is disclosed. The method includes detecting that a origin user's computing device is rendering a web page of the messaging platform; detecting that the origin user has provided the domain name to the web page of the messaging platform; obtaining a domain name system (DNS) resource record for the domain name; detecting, in the DNS resource record for the domain name, an entry for the messaging platform associated with a messaging platform account of the destination user; and sending origin-user-provided content to the messaging platform account of the destination user in response to at least the detecting that the origin user's computing device is rendering the web page of the messaging platform and the detecting the origin user has provided the domain name to the web page of the messaging platform.

BRIEF DESCRIPTION OF THE DRAWINGS

Various features of the embodiments can be more fully appreciated, as the same become better understood with reference to the following detailed description of the embodiments when considered in connection with the accompanying figures, in which.

DESCRIPTION OF THE EMBODIMENTS

Reference will now be made in detail to example implementations, illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

Domain name functionality has an opportunity for growth with the development of new internet social media platforms (including business-related platforms that include the functionality of traditional social media platforms) to better support the functionality of such platforms. Within these platforms, domains have a single use, that of identifying an external website. New functionality may be added to DNS to allow domains to have greater use within these internet platforms. Examples of such new functionality include: (1) in the context of a social network website, allowing a domain name to resolve to a social profile URL rather than an IP address, and 2) using a domain name as an identifier in a messaging platform. A solution is implemented by the use of a new flexible record type within DNS text ("TXT") resource records. Alternately, a new resource record in the DNS protocol could be created, a dedicated "context based response" or "CBR" record.

Some embodiments allow for the domain owner to control the interaction and to vary the interaction depending on the internet platform in use. By placing the control information in DNS, control of the data remains with the domain owner. Some embodiments provided herein help domains to be more relevant to the new and rapidly growing social internet. The disclosed functionally allows domain owners to selectively control the results their users see in various networks and also allows domains to be used as identifiers within these networks. Further, some embodiments achieve authentication of the linkage between the domain name and the data in the internet platform. These and other examples and benefits are disclosed herein.

Figure 1:
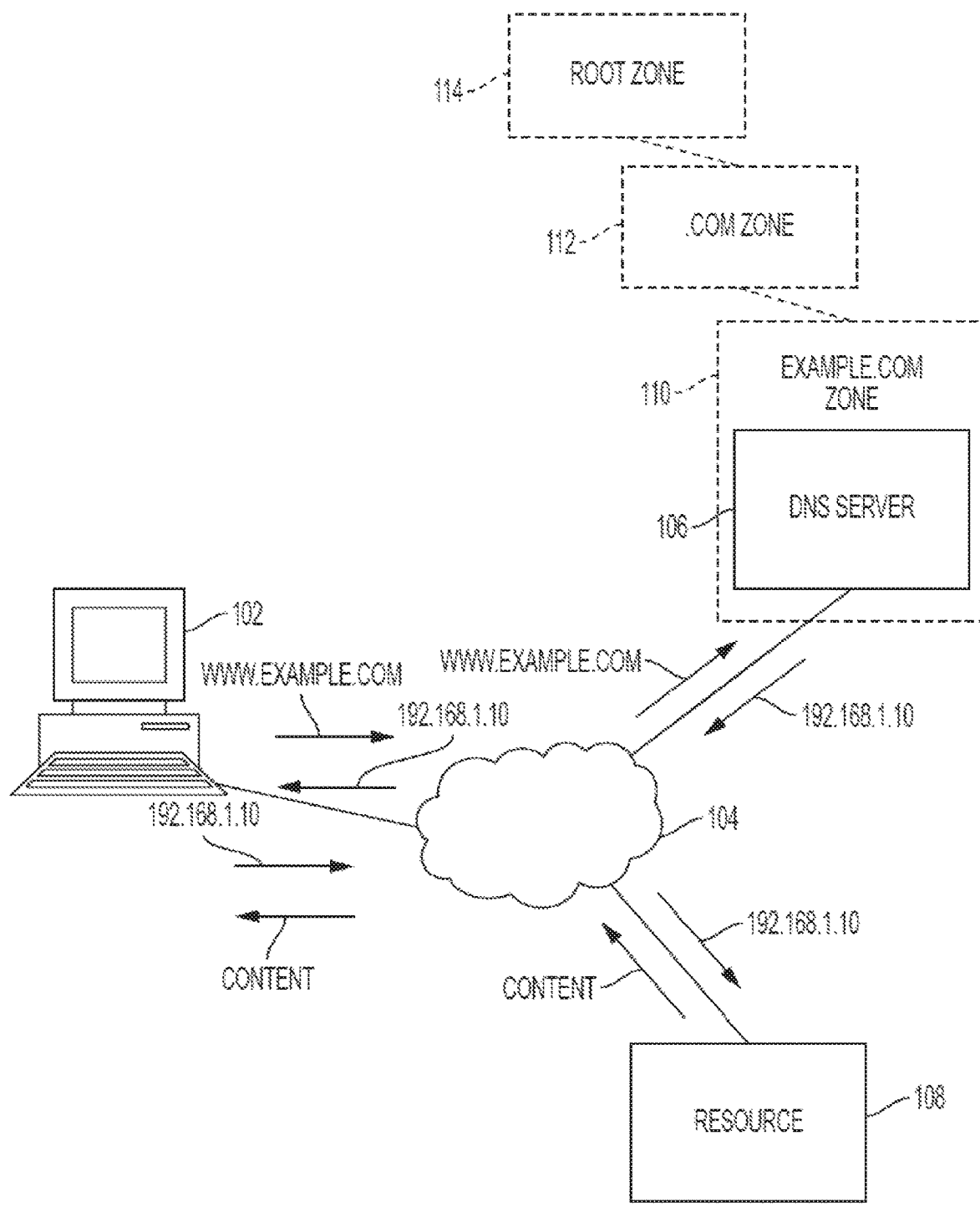
FIG. 1 is a schematic diagram depicting an example DNS interaction with a client.

FIG. 1 is a schematic diagram depicting, by way of background, an example DNS interaction. Note that the interaction depicted by FIG. 1 does not necessarily involve an embodiment of the invention, nor does it explicitly depict a social network or messaging website. Instead, FIG. 1 depicts an overview of one example of how DNS enables the internet to operate using domain names instead of numerical internet protocol (IP) addresses. That is, although networked computers generally rely on numerical locators such as IP addresses, human beings are ill-equipped to memorize such locators. Accordingly, DNS enables humans to rely on easy-to-remember domain names to access resources and data. Nevertheless, the hardware and resources depicted in FIG. 1 may be adapted as disclosed herein to implement an embodiment of the present invention. In other words, FIG. 1 depicts a structure in which an embodiment may be implemented.

A user may operate client computer 102. The user may activate a URL containing a domain name, e.g., http://www.example.com, by entering it into the navigation field of a web browser executing on client computer 102 or by clicking on a link for the URL as it is displayed in the browser on a webpage or other internet resource. Client computer 102 operates and/or contacts a recursive DNS server to look up the IP address corresponding to www.example.com. In particular, client computer 102 may send a resource record query to the recursive DNS server. For purposes of this example, the recursive DNS server lacks a resource record for www.example.com. According to the DNS protocol, the recursive DNS server may in this example query the root zone 114 for this record. By way of a DNS name server (NS) resource record, the root server points to a DNS server for .com zone 112, which provides an NS resource record that points to DNS server 106 for the zone for www.example.com, again, relying on an NS resource record. DNS server 106 responds with an appropriate DNS record (e.g., A or AAAA) that includes the requested IP address. Client computer 106 receives the resource record and parses it to extract the IP address. Client computer then contacts the IP address, which leads to resource 108, which may be a server computer. Resource 108 responds with the requested data, e.g., content.

Standing alone, the DNS protocol does not include any mechanism for selecting which destination resources are obtained according to the platform from which their domain names are activated, nor does it include any mechanism for addressing user accounts in messaging platforms using domain names. Accordingly, the present document discloses techniques for accomplishing these and other goals.

Figure 2:
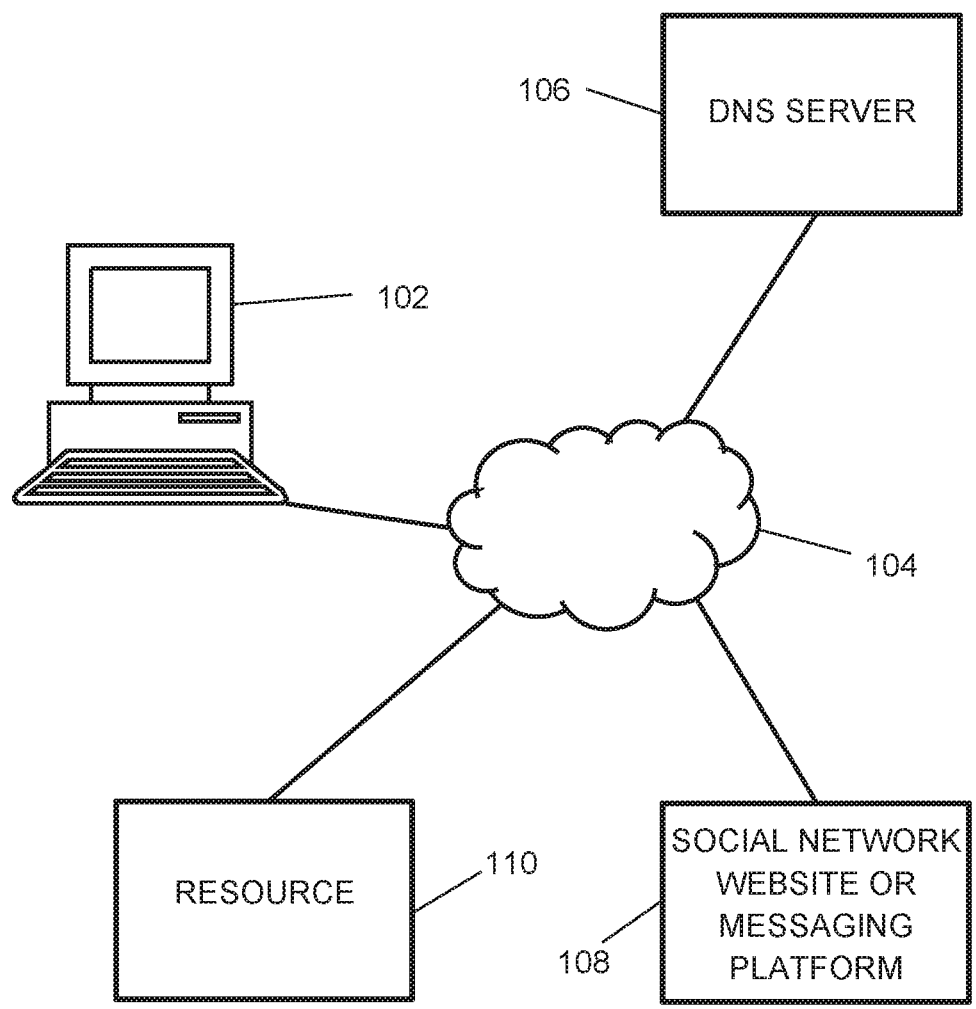
FIG. 2 is a schematic diagram of a system according to some embodiments.

FIG. 2 is a schematic diagram of a system according to some embodiments. The system of FIG. 2 includes user computer 102, which may be operated by a user of the internet, for example. While depicted as a desktop computer in FIG. 2, user computer 102 is not so limited. User computer 102 may be a desktop, laptop, pad, smart phone, or other device capable of performing the disclosed actions. User computer 102, as well as other devices disclosed in detail herein, are communicatively coupled to the internet 104.

The system of FIG. 2 also includes social network website or messaging platform 108. That is, according to various embodiments, social network website or messaging platform 108 may be either a social network website or a messaging platform.

In general, a "social network" is a website that provides users with accounts through which they may communicate with each-other by posting information, pictures, links (e.g., URLs), etc. to the website. Social networks generally provide users with the ability to establish formal in-network relationships with each-other. In general, when a user posts to a social network, all other users that have a relationship with the posting user may be able to view the post. Some social networks permit users to comment on other user's posts, even if such posts are not individually targeted.

In general, a "messaging platform" is a website that provides users with accounts through which they may send user-to-user messages. A user's account is typically addressed by way of that user's "handle" for the messaging platform. A "handle" as used herein is a string of characters used to address a user's account in a messaging platform. In general, when a user of a messaging platform sends a message, the message is sent to one or more other users to whom the message is directed, and/or to one or more users that sign up to receive all or a selection of messages from the sender.

The system of FIG. 2 also includes DNS server 106. For purposes of explanation of embodiments of the invention, a single server is shown in FIG. 2, however, as explained above in reference to FIG. 1, DNS server 106 may be one of a hierarchy of DNS servers that provide DNS information to user computer 102 and/or social network website or messaging platform 108. Thus, DNS server 106 may be a stub resolver, a recursive name server, an authoritative name server, a master name server, or a different DNS name server. DNS name server 106 provides DNS resource records to requestors through the DNS system.

The system of FIG. 2 also includes resource 110. Resource 110 is an internet-connected resource that may be downloaded by internet users, such as a user of user computer 102. Resource 110 may be a webpage, website, file transfer protocol (FTP) site, or other internet-connected resource. In general, resource 110 may be addressed by an internet domain name, e.g., www.example.com.

According to some embodiments, a link, e.g., a URL, to resource 110 may be posted on a social network website, e.g., social network website or messaging platform 108. A user may activate the link to attempt to retrieve the resource from within the social network website. Some embodiments detect that the link was activated from within the social network and, instead of retrieving resource 110, retrieve a page within the social network. Such a page may be specified by an owner of resource 110, such as a domain name registrant. This allows domain name registrants to control how they want their domains to interact with the social network. This functionality is enabled in part through the use of a new type of DNS resource record for resource 110. Embodiments that encompass these features are further shown and described below in reference to FIG. 3, below.

According to some embodiments, a domain name registrant may use the domain name as a handle for a messaging application, e.g., social network website or messaging platform 108. That is, some embodiments permit a registrant of a domain name for resource 110 to have that domain name as the registrant's handle in a completely separate messaging platform such as social network website or messaging platform 108. Other users of the messaging platform may send messages to the registrant of the domain name for resource 110 through the messaging platform by using the domain name itself as a handle. As further shown and described in reference to FIG. 4, below, this functionality is enabled in part through the use of a new type of DNS resource record for resource 110.

Figure 3:
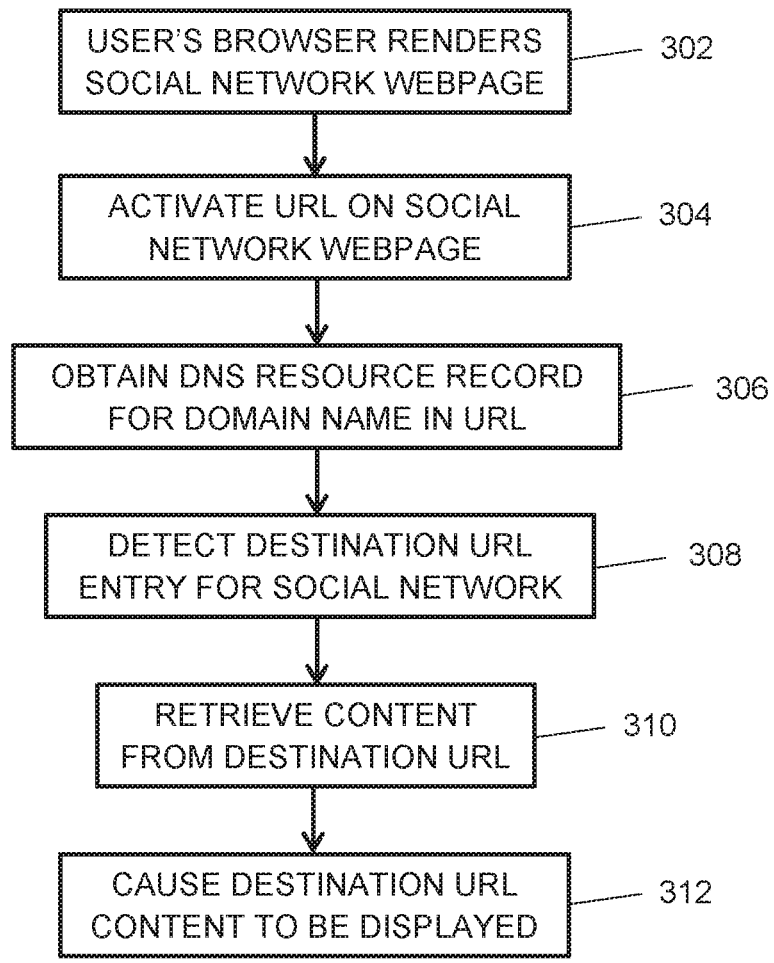
FIG. 3 is a flowchart of a method of resolving a uniform resource locator (URL) present on a social network website according to some embodiments.

FIG. 3 is a flowchart of a method of resolving a uniform resource locator (URL), which includes a domain name, present on a social network website according to some embodiments. The method may be carried out in a system such as the system shown and described in reference to FIG. 1. In such an instantiation, social network website or messaging platform 108 is a social network website. For the remainder of the discussion of FIG. 3, resource 110 is to be considered a website addressed by a domain name that is registered by a registrant, who also happens to have an account with the social network of FIG. 2.

Before the method of FIG. 3 takes place, the registrant of the domain name for resource 110 requests that the registry include a special DNS resource record in its records for resource 110. The special resource record may be implemented as a DNS text (TXT) record, for example, specially formatted as disclosed herein. Alternately, a new type of DNS resource record, a dedicated CBR resource record formatted as disclosed, may be used. Example such resource records are presented below in Tables 1 and 2.

TABLE 1 dailybleep.com
TXT record
    CBR:socialbook.com:http://www.socialbook.com/jc3737
    CBR:*:http://jc.wix.com/website

TABLE 2

Jacochran.com
TXT record
    CBR:linkedwith.com: https://www.linkedwith.com/in/jacochran
    CBR:socialbook.com:https://www.socialbook.com/jc3737
    CBR:twit.com: https://twit.com/jc3737/
    CBR:*: https://www.videos.com/channel/UCfIFopP72HGJ8QCChruZKWQ Tables 1 and 2 depict example DNS resource records suitable for inclusion in the DNS for resource 110. The resource records include context-based response ("CBR") information. In more detail, the records include information as to how a queried domain name should be resolved when activated in various contexts, such as on a social network (as shown and described presently in reference to FIG. 2) or within a messaging application (as shown and described below in reference to FIG. 3). In general, a DNS resource record that includes information for resolving a domain name in particular contexts is referred to as a context-based response ("CBR") resource record.

Thus, Table 1 depicts the contents of a CBR DNS resource record for the domain name "dailybleep.com", and Table 2 depicts the contents of a CBR DNS resource record for the domain name "jacochran.com". As described in detail below, and according to some embodiments, when an internet user attempts to resolve either of these domain names within a social network website, the resolution will be to a webpage internal to the social network rather than the usual website external to the social network.

The following discussion of FIG. 2 will proceed in reference to the CBR DNS resource records of Tables 1 and 2 being stored in the DNS for the domain names dailybleep.com and jacochran.com, respectively.

At block 302, an internet user's browser renders a webpage of a social network website. The user may have navigated his or her browser to such a webpage, for example, by clicking on a link, activating a bookmark, or typing the domain name for the social network website into the navigation field of the user's browser. The webpage may be for the user's own account with the social network, or for a different user's account. By way of non-limiting example, and for convenience of discussion, the remainder of the discussion of FIG. 2 will proceed with the understanding that the webpage rendered per block 302 is the user's own social media Socialbook news feed or profile, or the news feed or profile of a different Socialbook user. (As used herein, "Socialbook" is a fictional social media platform, used herein for purposes of explanation of the invention.)

At block 304, a link, e.g., URL, on the webpage is activated. There are several ways that such a link may be activated. The user may click on the link, for example. Alternately, the webpage may automatically activate the link as the user views the part of the webpage that includes the link.

At block 306, a DNS resource record for the domain name in the activated URL is obtained. The obtained resource record may be a CBR DNS resource record instantiated as a TXT DNS resource record, e.g., as shown in Tables 1 and 2. According to various embodiments, the DNS resource record may be obtained by a variety of entities. According to a first embodiment, the user's browser itself obtains the DNS resource record for the domain name in the URL of the activated link. Such a browser may be configured by its manufacturer, or by supplementary code (e.g., a "plugin"), to obtain a TXT resource record that contains context-based response information (e.g., as in Tables 1 and 2) prior to obtaining a resource record that contains IP address information (e.g., an A or AAAA resource record). If no such DNS CBR resource record is present, the browser may proceed to obtain an A or AAAA resource record and resolve the link per the usual DNS procedure. For this first embodiment, the user's browser also performs the detecting of block 308, the retrieving of block 210, and the displaying of block 312. According to a second embodiment, the social network website itself obtains the CBR DNS resource record. The social network website may be configured to automatically check for, and obtain if present, a CBR DNS resource record, before seeking an A or AAAA DNS resource record. If no DNS CBR resource record is present, the social network may proceed to obtain an A or AAAA resource record and resolve the link per the usual DNS procedure. For this second embodiment, the social network website that provides the context (in this example, socialbook.com) also performs the detecting of block 308, the retrieving of block 310k, and the causing to be displayed of block 312.

At block 308, the method detects a destination URL entry corresponding to the social network in the CBR DNS resource record for the domain name in the link activated at block 304. This detecting may be accomplished by known parsing technology applied to the CBR DNS resource record. As shown in Table 1, for example, which depicts a portion of contents of a DNS resource record for the domain name dailybleep.com, the destination URL is http://www.socialbook.com/jc3737 for the context of socialbook.com. Table 1 also includes a wildcard entry for the context, such that attempts to navigate to dailybleep.com from within any context other than socialbook.com will cause the user's browser (or socialbook.com) to obtain a destination URL of http://jc.wix.com/website instead. Note that the entries within a CBR DNS resource record may be ordered, such that the first matching entry will be returned to the requesting browser and no further matches may be sought.

Continuing the discussion of block 308, Table 2 contains multiple entries, corresponding to multiple contexts from within which an internet user may activate a link for jacochran.com. Thus, if activated within linkedwith.com, the internet user's browser (or socialbook.com) will obtain a URL for a Linkedwith webpage for an account of the registrant of jacochran.com, namely, https://www.linkedwith.com/in/jacochran. (As used herein, "Linkedwith" is a fictional business media platform that has the properties of a social media platform, used herein for purposes of explanation of the invention.) If the user activates jachchran.com from within socialbook.com, the user's browser (or socialbook.com) will obtain a URL for a Socialbook page of the registrant of jacochran.com, e.g., https://www.socialbook.com/jc3737. The entry for the context of twit.com will be discussed below in reference to FIG. 4. (As used herein, "twit" is a fictional messaging platform, used herein for purposes of explanation of the invention.) Finally, Table 2 depicts a wildcard context entry as its last entry, such that if the internet user's context does not otherwise match an earlier entry, the user's browser (or fsocialbook.com) will obtain the URL https://www.videos.com/channel/UCflFopP72HGJ8QCChruZKWQ.

At block 310, the method (i.e., the user's browser for the first example embodiment, or the socialbook.com social network website for the second example embodiment) retrieves content from the destination URL detected at block 308. The retrieval may play out according to the standard way of resolving URLs using DNS, e.g., as shown and described above in reference to FIG. 1. Namely, the user's browser (first example embodiment) or the social network website of socialbook.com (second example embodiment) obtains an IP address for the domain name in the destination URL using the DNS, then navigates to the IP address and retrieves content, e.g., using an HTTP GET command, for example. In some embodiments, an identification of the original URL that includes the domain name for which the CBR DNS resource record is retrieved is sent to the DNS as part of the DNS resolution process of the destination URL. This may be controlled by a parameter inf the CBR DNS resource record itself, e.g., by including the string "website: URL=Y" at the end of an individual entry in the CBR.

At block 312, the method (i.e., the user's browser for the first example embodiment, or the socialbook.com social network website for the second example embodiment) causes the retrieved content to be displayed. In the case of the browser, the browser renders the content and causes it to be displayed on a monitor of the computer system on which the browser is executing. In the case of the social media website (e.g., socialbook.com), the social media website causes the content to be included in an account page (e.g., a profile or news feed page on which the URL that was activated per block 304 appeared). This inclusion causes the user's browser to display the content as part of displaying the account page.

Figure 4:
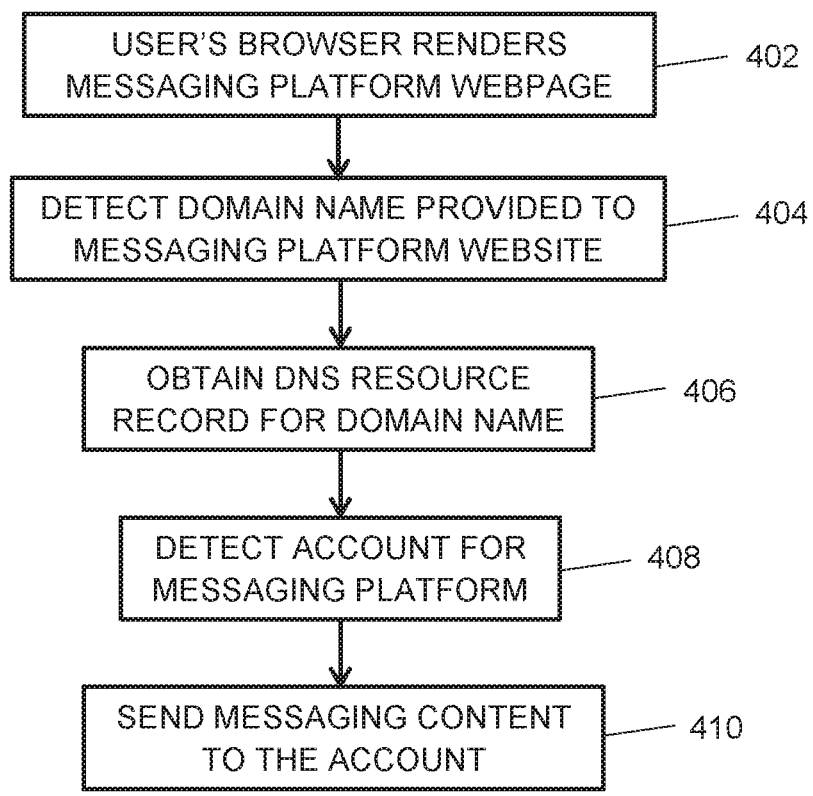
FIG. 4 is a flowchart of a method of directing an electronic message, within a computer messaging platform, to a destination user identified by a domain name, according to various embodiments.

FIG. 4 is a flowchart of a method of directing an electronic message, sent from within a computer messaging platform, to a destination user identified by a domain name, according to various embodiments. The method may be carried out in a system such as the system shown and described in reference to FIG. 1. In such an instantiation, social network website or messaging platform 108 is a messaging platform, e.g., twit.com. For the remainder of the discussion of FIG. 4, resource 110 is to be considered a website addressed by a domain name that is registered by a registrant, who also happens to have an account with the messaging platform of FIG. 2. Again for ease of exposition, for the remainder of the discussion of FIG. 4, the registrant of the domain name of resource 110 is referred to as the "destination user".

Note that account holders of the messaging platform may send messages amongst themselves through the messaging platform website. In particular, each account holder is assigned (or chooses) a "handle" that serves as an account identifier for purposes of routing messages through the messaging platform. Such handles are not domain names; rather, they generally have formats specific to the messaging platform. For example, some messaging platform handles are of the form @[string], where [string] is an ASCII string of characters. For ease of discussion, assume without imitation that the handle of the destination user for the messaging platform under discussion is "@destination_user".

Before the method of FIG. 4 takes place, the registrant of the domain name for resource 110, i.e., the destination user, requests that the registry include a special DNS resource record in its records for the domain name of resource 110. The special resource record may be a DNS text (TXT) record, for example, formatted as disclosed herein with respect to Tables 1 and 2. That is, the special DNS resource record may be a CBR DNS resource record. For the remainder of the discussion of FIG. 4, consider, by way of non-limiting example, that the CBR DNS resource record which contents are depicted in Table 2 has been stored in the DNS for the domain name jacochran.com. Thus, the example arrangement of FIG. 4 has resource 110 including a website for the domain name jacochran.com, which is registered by the destination user.

At block 402, a user of client computer 102 (typically not the same user as the registrant of the domain name of resource 110) directs his or her web browser executing on client computer 102 to the website of a messaging platform. This user, referred to for the remainder of the discussion of FIG. 4 as the "origin user", may direct his or her browser to the messaging website by clicking on a link, activating a bookmark, or typing a URL into the address bar of the browse.

At block 404, the origin user commences a process for sending a message to the destination user. Thus, at block 404, the origin user provides the domain name jacochran.com of resource 110, i.e., the domain name for which the receiving user is the registrant, to the messaging platform as a destination of an associated message. The origin user may provide the domain name to the messaging platform in various ways. For example, some messaging platforms provide separate fields in which a message sender enters the handle for the intended message recipient. In such messaging platforms, the origin user may type the domain name of the destination user into the field that is typically reserved for handles. Per block 404, the messaging platform detects that a domain name has been entered as an identity of an intended message recipient.

At block 406, the messaging platform obtains a DNS resource record for the domain name for which the destination user is the registrant, i.e., jacochran.com. The obtained resource record may be a CBR DNS resource record instantiated as either a TXT DNS resource record or as a dedicated CBR resource record, e.g., as shown in Table 2. The messaging platform may be configured to obtain the record from the DNS using standard DNS record retrieval techniques adapted for retrieving CBR DNS resource records as opposed to, e.g., A or AAAA DNS resource records.

At block 408, the messaging platform parses the DNS resource record obtained at block 406 to determine messaging platform account information, e.g., a handle. Thus, the messaging platform detects that an entry for the domain name of the messaging platform itself exists. Thus, the messaging platform detects a row that begins "CBR:twit.com". This provides an indication that the text that follows provides account information for the intended recipient of the message, i.e., the destination user. Per the information in Table 2, the messaging platform retrieves the URL https://twit.com/jc3737. The messaging platform checks its own internal records to determine that the account handle corresponding to that URL is @jc3737. The messaging platform thus extracts the handle from its records based on the URL.

At block 310, the messaging platform sends message content supplied by the origin user (e.g., as part of block 404 or otherwise) to the destination user at the account handle obtained from a DNS record for the domain name registered by the destination user. The messaging platform up to this point has the messaging content provided by the origin user, as well as a handle for the destination user. Accordingly, the messaging platform sends the message to the destination user, s using the destination user's handle, consistent with its normal operation.

Certain embodiments can be performed using a computer program or set of programs. The computer programs can exist in a variety of forms both active and inactive. For example, the computer programs can exist as software program(s) included of program instructions in source code, object code, executable code or other formats; firmware program(s), or hardware description language (HDL) files. Any of the above can be embodied on a transitory or non-transitory computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations.

In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A method of resolving a uniform resource locator (URL) present on a social network website, the method comprising:
   detecting that a user computing device is rendering a social network web page on the social network website;
   detecting a user activation of the URL present on the social network web page, wherein the URL present on the social network web page comprises a domain name different from a domain name for the social network website;
   obtaining a domain name system (DNS) resource record for the domain name;
   detecting, in the DNS resource record for the domain name, an entry for the social network website associated with a destination URL;
   retrieving content from the destination URL in response to at least the detecting that the user's computing device is rendering the social network web page and the detecting the user activation of the URL present on the social network web page; and
   causing the content to be displayed.

2. The method of claim 1, wherein the detecting that the user computing device is rendering the social network web page is performed by a web browser executing on the user computing device.

3. The method of claim 1, wherein the detecting that the user computing device is rendering the social network web page is performed by the social network web page.

4. The method of claim 1, wherein the DNS resource record is a text (TXT) DNS resource record.

5. The method of claim 1, wherein the destination URL is for a social network web page of an owner of the domain name.

6. The method of claim 1, wherein the retrieving content is performed by the social network website.

7. The method of claim 1, wherein the retrieving content is performed by a web browser executing on the user computing device.

8. The method of claim 1, wherein the DNS resource record comprises a plurality of entries, each of the plurality of entries comprising a domain name associated with a respective destination URL not comprising the associated domain name.

9. The method of claim 1, wherein the social network web page is a social network profile page for an entity different from the user.

10. The method of claim 1, wherein the retrieving content from the destination URL further comprises forwarding the URL present on the social network web page to a computer host of the destination URL.

11. A system for resolving a uniform resource locator (URL) present on a social network website, the system comprising at least one electronic processor configured to perform:
   detecting that a user computing device is rendering a social network web page on the social network website;
   detecting a user activation of the URL present on the social network web page, wherein the URL present on the social network web page comprises a domain name different from a domain name for the social network website;
   obtaining a domain name system (DNS) resource record for the domain name;
   detecting, in the DNS resource record for the domain name, an entry for the social network website associated with a destination URL;
   retrieving content from the destination URL in response to at least the detecting that the user computing device is rendering the social network web page and the detecting the user activation of the URL present on the social network web page; and
   causing the content to be displayed.

12. The system of claim 11, wherein the at least one electronic processor configured to perform detecting that a user computing device is rendering the social network web page comprises at least one electronic processor of the user computing device executing a web browser on the user computing device.

13. The system of claim 11, wherein the at least one electronic processor configured to perform detecting that a user computing device is rendering the social network web page comprises at least one electronic processor of computing equipment hosting the social network web page.

14. The system of claim 11, wherein the DNS resource record is a text (TXT) DNS resource record.

15. The system of claim 11, wherein the destination URL is for a social network web page of an owner of the domain name.

16. The system of claim 11, wherein the at least one electronic processor configured to perform retrieving content comprises at least one electronic processor of computing equipment hosting the social network web page.

17. The system of claim 11, wherein the at least one electronic processor configured to perform retrieving content comprises at least one electronic processor of the user computing device executing a web browser on the user computing device.

18. The system of claim 11, wherein the DNS resource record comprises a plurality of entries, each of the plurality of entries comprising a domain name associated with a respective destination URL not comprising the associated domain name.

19. The system of claim 11, wherein the social network web page is a social network profile page for an entity different from the user.

20. The system of claim 11, wherein the at least one electronic processor configured to perform retrieving content from the destination URL is further configured to forward the URL present on the social network web page to a computer host of the destination URL.

21. The method of claim 1, wherein the destination URL is for a social network web page on the social network website.

22. The system of claim 11, wherein the destination URL is for a social network web page on the social network website.

* * * * *